United States Patent [19]

Slattery

[11] Patent Number: 5,794,711
[45] Date of Patent: Aug. 18, 1998

[54] GROUND FOLLOWING OPENER APPARATUS

[75] Inventor: Michael Gerard Slattery, Windsor Gardens, Australia

[73] Assignee: Techsearch Incorporated, North Adelaide, Australia

[21] Appl. No.: 691,984

[22] Filed: Aug. 2, 1996

[30] Foreign Application Priority Data

Aug. 4, 1995 [AU] Australia .................. PN4603

[51] Int. Cl.[6] .................. A01B 49/06; A01C 5/06
[52] U.S. Cl. ................ 172/265; 172/624.5; 172/661
[58] Field of Search .................. 172/624.5, 261, 172/264, 265, 266, 267, 268, 661; 111/151, 62, 134, 135, 66

[56] References Cited

U.S. PATENT DOCUMENTS

| | | | |
|---|---|---|---|
| 3,627,061 | 12/1971 | Sample | 172/624.5 X |
| 4,126,190 | 11/1978 | Wylie | 172/624.5 |
| 4,580,507 | 4/1986 | Dreyer et al. | |
| 4,694,759 | 9/1987 | Dreyer et al. | 172/624.5 X |
| 4,702,323 | 10/1987 | Smit et al. | 172/624.5 X |
| 4,750,440 | 6/1988 | Pollard et al. | 172/624.5 X |
| 4,759,301 | 7/1988 | Thomas | 172/776 X |
| 4,834,189 | 5/1989 | Peterson et al. | 172/624.5 X |
| 4,974,683 | 12/1990 | Hanig et al. | 172/624.5 X |
| 5,529,128 | 6/1996 | Peterson et al. | 172/624.5 X |
| 5,560,433 | 10/1996 | Grimm et al. | 172/266 |

FOREIGN PATENT DOCUMENTS

| | | |
|---|---|---|
| 4738685 | 3/1986 | Australia . |
| 5870686 | 12/1986 | Australia . |
| 9321754 | 11/1993 | WIPO . |

*Primary Examiner*—Michael J. Carone
*Assistant Examiner*—Christopher J. Novosad
*Attorney, Agent, or Firm*—Webb Ziesenheim Bruening Logsdon Orkin & Hanson, P.C.

[57] ABSTRACT

A ground following opener is provided which includes a support frame, a parallelogram arrangement pivotably attached to the support frame, a tyne shank supported by the parallelogram arrangement and an opener supported at a free end of the tyne shank.

15 Claims, 5 Drawing Sheets

GROUND FOLLOWING OPENER APPARATUS

BACKGROUND OF THE INVENTION

1. Field of the Invention

This invention relates to soil engaging apparatus and in particular to an apparatus suitable for no-till, direct drill and minimum tillage seeding, planting or pasture renovation which provides depth control, contour following and stump jump features.

2. Description of the Prior Art

Tillage is the mechanical manipulation of soil for desired purposes but specifically in agriculture is restricted in meaning to the changing of soil conditions for the enhancement of crop production. No-till involves only disturbing the soil a necessary amount so as to place the seed and fertilizer. Direct drill seeding is a process of seeding directly into previously undisturbed soil and minimum tillage involves the least soil manipulation necessary prior to seeding for optimum crop production or enhancement with regard to existing soil conditions.

Soil interactions which will affect the type of tillage used include soil abrasion, soil adhesion and soil shatter which are likely reactions to different types of tillage.

Various soil engaging components are attachable to the frame of the tillage or seeding apparatus and careful choice in accord with experience and soil condition is required to achieve a desired crop outcome.

However, just as important as soil engaging tool choice is the use of a frame attachment mechanism which will provide a simple, easily maintained, reliable means for maintaining control of the soil depth penetration and hence the depth of seed placement (contour following) and safety tripping (stump jump or obstacle jumping).

Known seeding machines incorporate a variety of depth control mechanisms some of which use a follower wheel connected via passive and sometimes active height adjustment means to move the ground engaging opener with respect to the frame so as to maintain a predetermined depth in the ground.

An opener "opens" a continuous cleft, furrow or undercut in the soil to allow for subsurface seed and/or fertilizer deposition in a row. These opener components are also referred to as seed shoes, seed openers, furrow openers, or seed—furrow openers, disc openers, shares or tillage points. Soil opening for seed placement may or may not be preceded by soil and residue cutting components and/or row preparation components, depending on the type of opener used, the soil surface condition, and the required seeding practice for the type of crop and/or soil condition.

The performance of an opener component is typically sensitive to its travel velocity, the type and condition of soil, the level of residue, and the required seeding depth which is typically 30–50 mm for wheat, 5–10 mm for pasture and various other depths to suit the seed type being planted.

The opener is typically attachable to a tyne shank which is attached to the frame. A contour (ground) following member, typically a wheel, is attached either to the shank or to an arm of a parallelogram which vertically guides the opener while the attached wheel follows the ground contours.

It is common to use a parallelogram arrangement to maintain depth or provide depth control which typically has a bias supplied between selected arms of the parallelogram to provide a downward force to the opener by the tyne shank as well as to maintain the follower in contact with ground contours.

When the ground follower rises or falls the opener rises and falls in concert with it. The parallelogram maintains the tyne shank at a predetermined angle (typically vertical) thus maintaining within reasonable limits the same angle of penetration of the opener to the soil.

When an obstacle is met by the opener, such as a large stone, tree root or stump, it is important for there to be a trip mechanism, which allows the opener to ride or rise over the obstacle so as to avoid damage to the opener and the tyne shank which carries it.

There is a variety of mechanisms available typically requiring a bias means or compressible means to absorb at impact the force of the motion of the opener and tyne shank as they move to clear the obstacle and then return them to their ground engaging position.

It is advantageous to have both tripping and contour following features in a tillage apparatus. However, although this arrangement is known to exist, each feature is either operated independently of the other or the features are combined in such a manner as to require a plurality of interrelated mechanical operations and bias mechanisms.

The invention described in the specification overcomes and eliminates some of the complexity of those prior arrangements.

SUMMARY OF THE INVENTION

In a broad aspect of the invention, a ground following opener comprises a support frame, a parallelogram means pivotally attached to said frame, a tyne shank supported by said parallelogram means; and an opener means supported at a free end of said tyne shank, said pivotal attachment being arranged to allow rotational movement (tripping) of said parallelogram independent of said frame so that said opener means can pass over the surface of an obstacle in the ground. A ground following means is attached to an arm of said parallelogram supporting said tyne shank operative to move the parallelogram supporting said tyne shank as it follows the ground. A single bias means is pivotally attached at one end to said support frame and pivotally attached at its other end to an arm of said parallelogram, such that said single bias means urges said opener means into the ground as well as biasing the return of said parallelogram, tyne, ground follower and opener means to a ground following operation after being rotated independent of said frame when said opener means passes over the surface of an obstruction.

In a further aspect of the invention said bias means preferably comprises a compression spring assembly acting between the support frame and an upper arm of said parallelogram and so arranged as to compress upon rotational movement of said arm about its pivot as well as when the parallelogram rotates in an upward direction and the opener and tyne shank move rearward of said pivot about a pivot means on said support frame.

In a further aspect of the invention, said bias means is arranged to load the tyne mechanism such that the effective loading at the opener tip does not increase greatly beyond the desired break out load. This means the tyne shank and opener strength need only be built to withstand loading marginally greater than that required to achieve tripping.

In a further aspect of the invention, a spring biasing means is preferably provided with an adjusting means for varying the biasing downward force exerted on an arm of said parallelogram.

In a further aspect of the invention, the axis of the pivotal attachment to said biasing means of said parallelogram is offset from the axis of the pivotable attachment between said parallelogram arms.

In yet a further aspect of the invention, the offset is preferably adjustable to suit the application of the invention or to adjust to suit different tillage and seeding techniques, soil types and conditions.

In a yet further aspect of the invention, said follower means is a wheel which is preferably located on the ground forward and to the side of the path of said ground engaging means.

In a yet further aspect of the invention, the follower means is provided with toe-in.

The invention will now be explained by way of example using a preferred embodiment which is depicted in the FIGS. accompanying this specification. The embodiment is illustrative only and not meant to be restrictive of the scope of the definition of the invention.

BRIEF DESCRIPTION OF THE FIGS.

DESCRIPTION OF THE PREFERRED EMBODIMENT

Although this embodiment is related to a ground following opener suitable for no-till, direct drill and minimum tillage seeding, the principle and arrangement disclosed will be applicable to many other types of soil-engaging components used in tillage for soil preparation, planting, drilling and seeding.

It should also be noted that the terminology used in this specification to identify certain agricultural components, operations and terms may differ from that used elsewhere. However, where applicable the terms used in ASAE Standards S477 December 93 Terminology for Soil—Engaging Components for Conservation—Tillage Planters, Drills and Seeders, the ASAE Standard S414 Terminology Definitions for Agricultural Tillage Implements; and the ASAE Engineering Practice EP291 Terminology Definitions for Soil Tillage and Soil—Tool Relationships are used in the description of this embodiment of the invention.

However, differences in terminology may also arise because of conditions unique to Australia or over time similar items have acquired a colloquial name. This should not unduly affect the scope of the invention.

Figure 1:
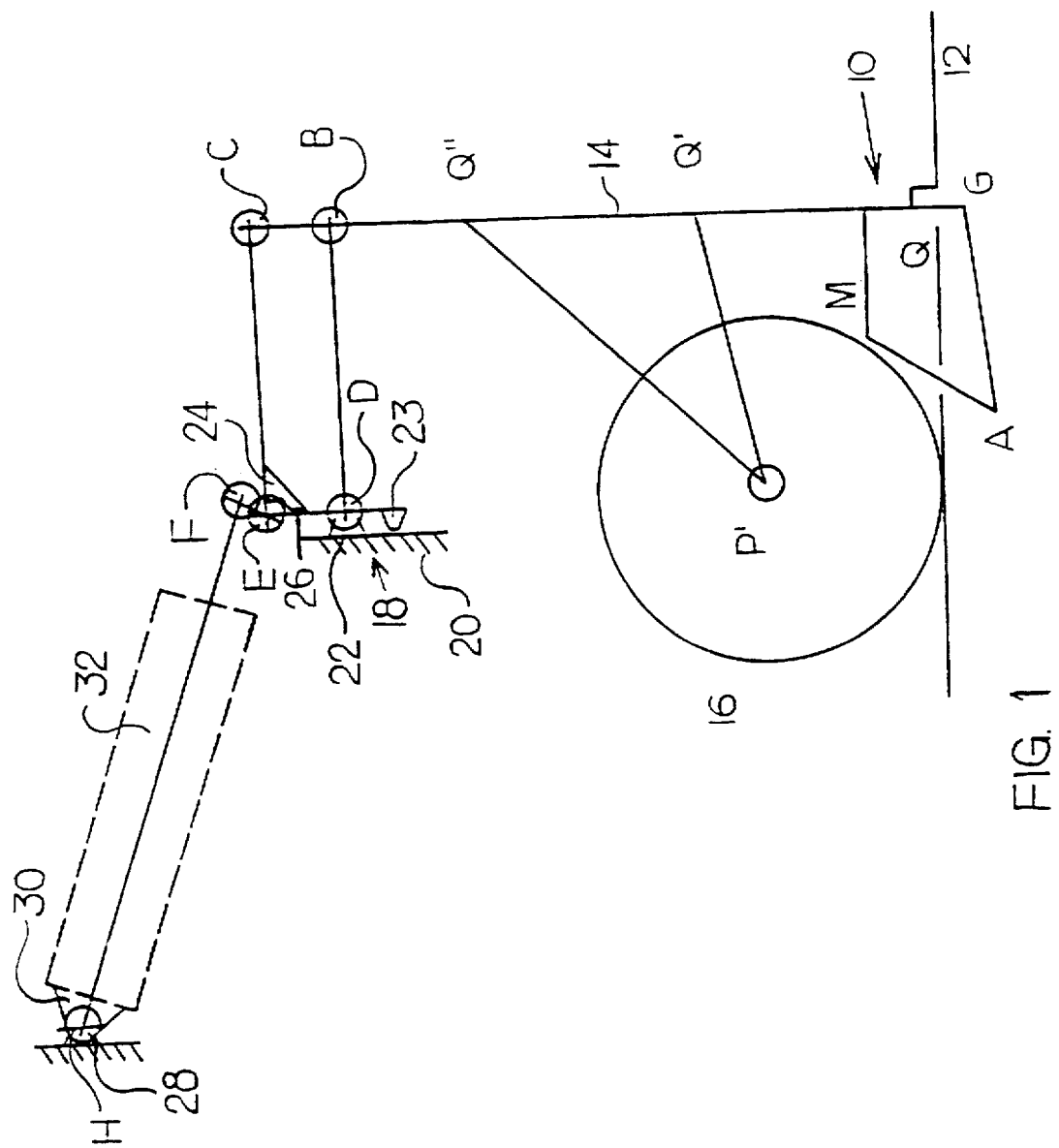
FIG. 1 depicts a line drawing of the major elements of an embodiment of the invention.

FIG. 1 depicts a line drawing of the major elements of an embodiment of the invention. The opener 10 is shown partially engaging the soil 12 and in an ideal situation the line A-M along the face of the opener is maintained at a constant rake angle to the surface of the soil.

When the rake angle is maintained, the desired soil disturbance, furrow opening and closing is achieved.

The opener 10 is fixed to the free end of the tyne shank 14 the upper end of which forms or is attached to a preferably vertical arm C-B of a parallelogram arrangement.

The ground follower 16, in this embodiment, is a pneumatic or solid wheel which rotates on an axis at P'. The ground follower is supported from the tyne shank 14 between points Q", Q' and P' so that as the contour of the soil changes the tyne shank is raised and lowered. The depth of the opener in the ground is set by adjustment of the ground follower 16 along the length of the tyne shank 14. The ground follower, as will be shown in detail later in the specification, is preferably located slightly forward of the opener and to the side of the path of the opener. The follower is attached to the apparatus so that the parallelogram arrangement moves with the contour of the ground at or near the ground engaging tool (opener).

Ideally the follower is located exactly where the ground is engaged. However this is not readily achievable.

The parallelogram arrangement comprises arms E-C, C-B, B-D and D-E of which C-B is attached to or is part of the tyne shank 14. Points E, C, B and D are points at which pivots are located. However, as is the characteristic of such an arrangement arms E-C and B-D remain parallel to each other as do arms D-E and C-B as the ground follower 16 moves up and down.

Point D pivots with and is attached to the frame 18 which is pictorially represented as a wall 20 and lug 22. Stop 24 is attached to parallelogram arm E-C and has an abutment portion which abuts on the parallelogram arm D-E when parallelogram arm E-C is at right angles to D-E. This particular arrangement is merely illustrative based on an example of the arm E-C being kept horizontal and parallel to the substantially horizontal ground surface.

The use of a stop 24 may also be arranged to maintain a minimum angle, for example, 90° between parallelogram arm E-D and the top parallelogram arm E-C by having the abutment portion 26 abut against arm E-D. Alternatively, the stop 24 can set the substantially horizontal arms of the parallelogram to lie at a predetermined angle to the horizontal, say 2° when in their lowest ground following position. This will assist the application of downward forces to the opener.

Further, the stop 24 is also used to prevent the parallelogram collapsing downward during transportation. Stop 23 is located on the base of parallelogram arm D-E and only moves off the frame wall 20 when the tripping mechanism is operating but otherwise keeps arm E-D substantially vertical.

The frame 18 also extends to frame wall 28 and lug 30 which supports, in this example, a pivot means at point H, which is attached to one end of a bias means 32. The bias means may comprise a spring in compression, exerting a force at its ends outward along its axis H-P. Alternatively the bias means may be an adjustable hydraulic ram arrangement or other bias elements. The bias means 32 is preferably adjustable so that greater or lesser force may be exerted through the tyne to the opener.

The other end of the bias means 32 is pivotally attached at point F to the upper arm E-C of the parallelogram.

The bias force exerted on point F operates through arm E-C and down to the opener 10 through the tyne shank 14. The amount of force exerted by the bias means is preferably adjustable and adjustment is made so that the ground engaging opener is provided with an appropriate penetration force. Adjustment of the initial compression characteristics of the bias means and adjustment of the distance (offset) between pivots E and F allow for a range of combinations of break out resistance and penetration force.

The bias means is also operable to return the apparatus to its ground opening position after the ground opener has cleared an obstacle. The parallelogram to which the opener is connected via the tyne shank is arranged to pivot about point D so that an obstacle can be jumped over by the apparatus. This is also sometimes referred to as a trip, overload, break out or break away feature. Thus the pivotal attachment of the parallelogram allows rotational movement of the parallelogram independent of the frame so that the opener can pass over the surface of an obstacle in the ground.

The break out feature of this invention operates independently of the ground follower function of the apparatus.

Figure 2:
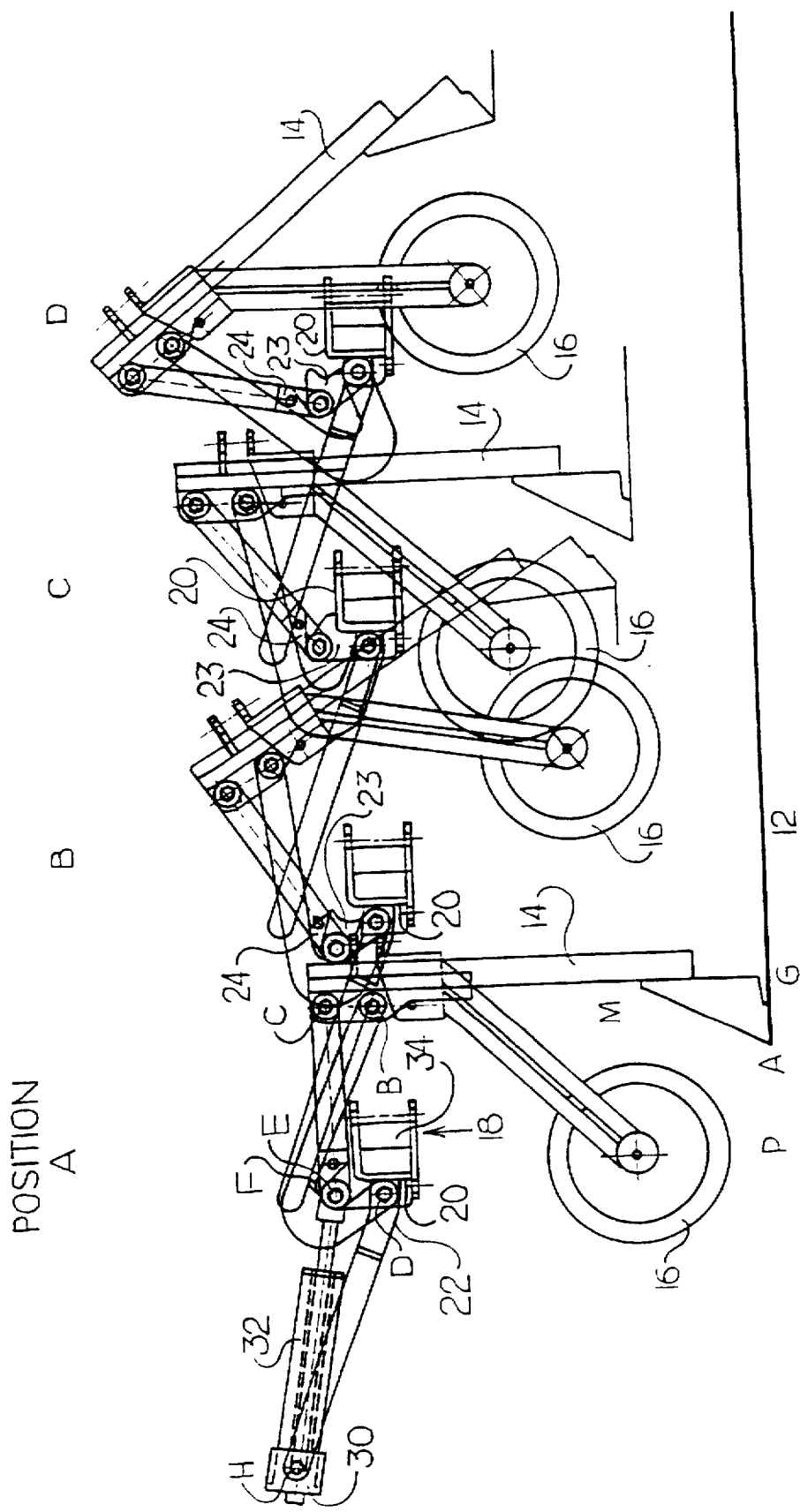
FIG. 2 depicts various positions of an embodiment of the invention.

The independent nature of the break out and ground following functions is depicted in FIG. 2 in a multiple position collage of several phases during operation of the invention.

Like elements of FIG. 1 are similarly numbered in FIG. 2.

The frame 18 is shown attached to a drawbar 34 (shown in cross-section) and attached to the frame wall 20 is a lug 22. A pivot element is located at D and parallelogram arm B-D has an unusual shape but still functions as a parallelogram arm by maintaining a constant distance between pivot points B and D. The unusual shape of arm B-D is required in this embodiment so as to allow the tyne shank 14 to be located closer to the drawbar 34 than if the pivot point D were located rearward of the drawbar. The unusual shape allows the points B and D to be joined but still allows the parallelogram ground following and break out functions to be performed.

The apparatus is first depicted at position A of FIG. 2 having the lowest position of the various elements while ground following.

At position B of FIG. 2 the apparatus is depicted at its full break out orientation while also in its lowest ground following orientation. The stop 23 is shown raised from the frame wall 20 while stop 24 remains in abutment with arm E-D.

Position C of FIG. 2 shows the apparatus operating at its highest ground following position. The stop 23 is shown abutting the frame wall 20 while the parallelogram is orientated so as to maintain the vertical orientation of the tyne shank 14 and stop 24 raised away from arm E-D.

Position D of FIG. 2 shows the apparatus operating at its highest ground following position while also at its full break out orientation. The stop 23 is shown raised from the frame wall 20 and stop 24 is raised away from arm E-D.

Thus it is clearly shown that ground following and break out functions of the apparatus operate independently of each other. Furthermore it is the function of the common bias means 32 to provide a bias force for and applicable to each function.

In a further aspect of the invention, said bias means is arranged to load the tyne mechanism such that the effective loading at the opener tip does not increase greatly beyond the desired break out load. This means the tyne shank and opener strength need only be built to withstand loading marginally greater than that required to achieve tripping.

A method to achieve this is depicted using FIGS. 1 and 2. The moment or torque applied about D due to the compressive forces in element H-F is the multiplication of this force by the perpendicular distance from a line passing through H and P to the point D. As the mechanism breaks out, as depicted in FIG. 2 (positions B and D), element H-P shortens and hence the compressive force increases. However, at the same time the perpendicular distance from D to a line through H and P is reduced, thus the moment or torque about D due to the compressive force at F will remain the same and/or be reduced. When tripping occurs the torque about D due to loading at F is overcome by an opposing torque resulting from a force applied at the tip equivalent to or greater than the break out load.

Figure 3:
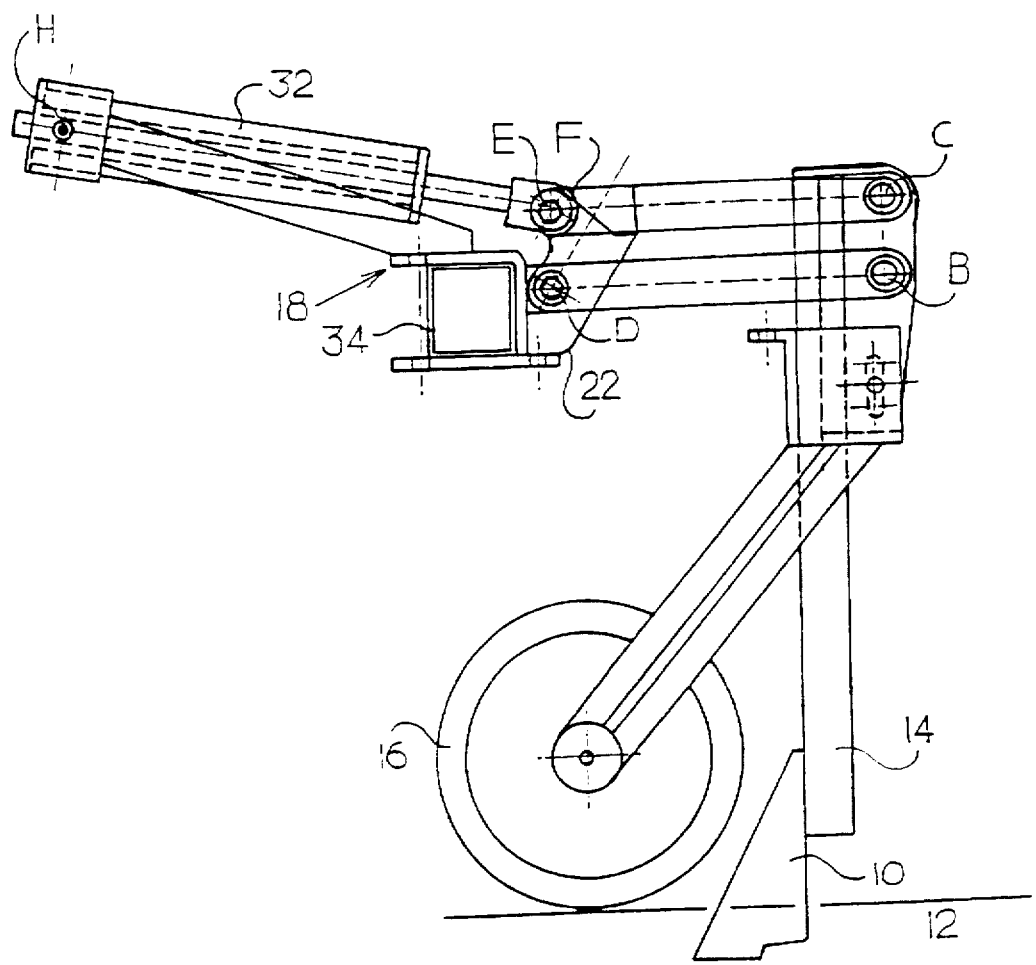
FIG. 3 depicts a further embodiment of the invention showing pivot point D rearward of the drawbar.

FIG. 3 depicts a further embodiment of the invention showing the pivot point D rearward of the drawbar 34 but shows to scale the small offset of pivot point F from E where it will be noted that parallelogram arm B-D is linear unlike that shown in FIG. 2.

Figure 4:
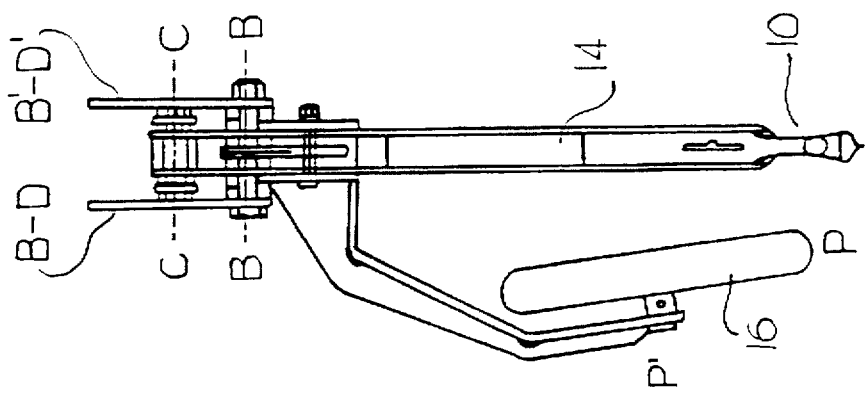
FIG. 4 depicts a rear view of an embodiment of the invention.

FIG. 4 depicts a rear view of the apparatus with like elements in FIGS. 1, 2 and 3 identified with like numerals. Parallelogram arm B-D is shown as a pair of like arms B-D and B'-D' and the pivot points B and C are shown as axes B-B and C-C.

A follower 16 contacts the ground at P and rotates about P' and is orientated at an angle other than normal to the ground to reduce the build up of residue on tyne shank 14. The follower 16 also is provided with an amount of toe-in to improve tracking of the apparatus and reduce soil build up on its surface.

Figure 5:
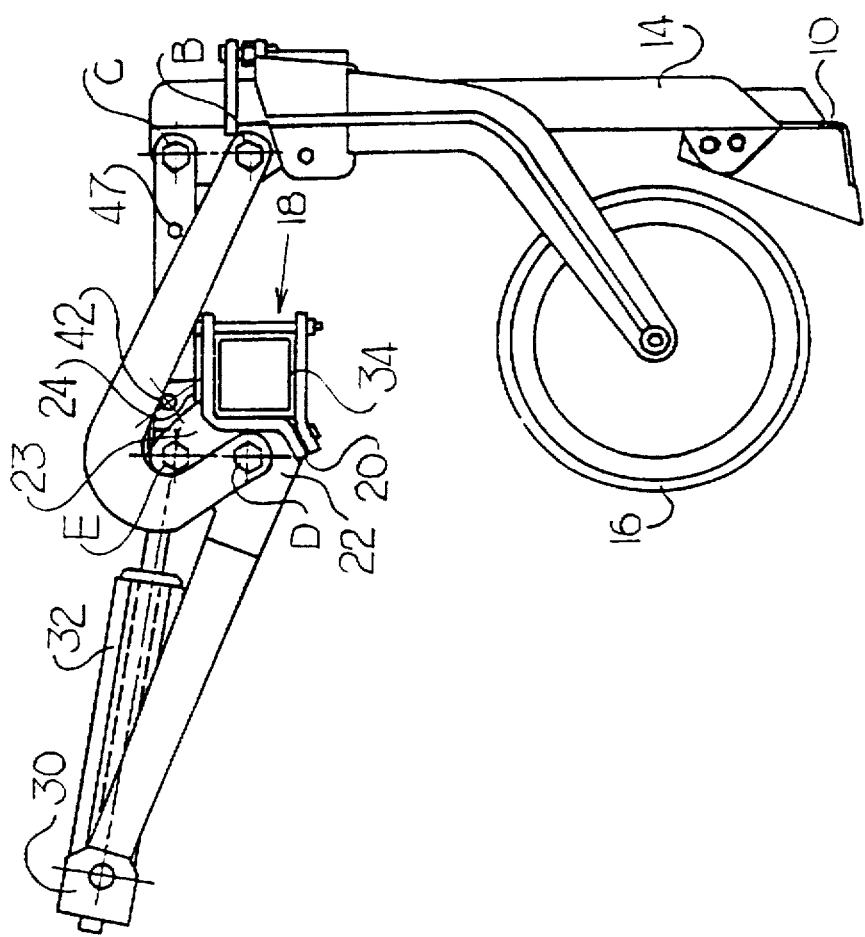
FIG. 5 depicts a side view of an embodiment of the invention.

FIG. 5 is a clearer side view of an embodiment of the invention showing more clearly the various arms of the parallelogram E-C, C-B, B-D and D-E, the opener 10, the tyne shank 14, the ground follower 16, the drawbar 34, frame 18, frame wall 20, lug 22, stop 24, lug 30 and bias means 32.

Not shown in FIG. 5 is a pivot point P at the parallelogram 15 end of the bias means 32 which is offset from pivot point E.

Figure 6:
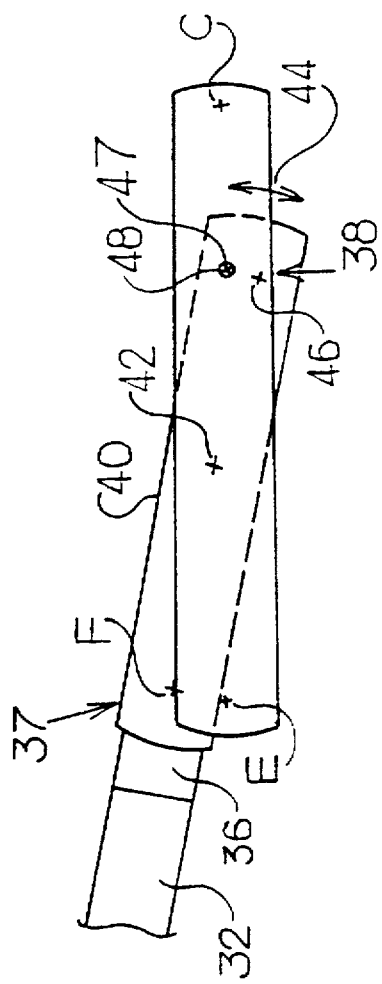
FIG. 6 depicts a side view of the adjustable offset mechanism.

FIG. 6 depicts a side view of the offset of point P to point E. The amount of offset can be adjusted using a series of apertures in arm 40 (from 46 to 48) by aligning with aperture 47 in parallelogram arm E-C. The position of P is a fixed distance from E and the line P-E is shown on FIG. 1 as being at a right angle to the line H-P through the axis of the bias means. The use of a right angle is merely preferable.

FIG. 6 also depicts a specific means for adjusting the offset of point P from point E. Point P lies on an axis of a pivot means 36 located on an end of the bias means 32 and a first end 37 of an arm 40. Arm 40 pivots at a point 42 intermediate its ends 37 and 38. The second end 38 of the arm 40 is movable through a circular arc 44 and is fixed to the parallelogram arm E-C where required so as to offset point P from point E.

Point P is offset to its maximum extent when the aperture 47 is in alignment with aperture 48 on arm 40 and is offset to its minimum extent when aperture 47 is aligned with 46.

Figure 7:
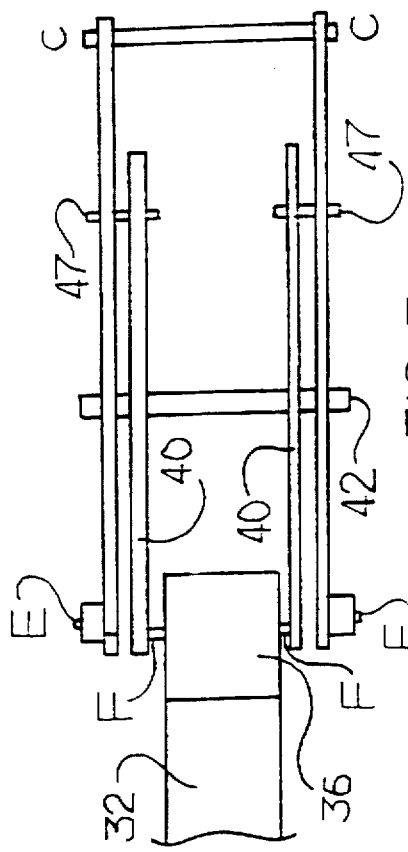
FIG. 7 depicts a plan view of the adjustable offset mechanism.

FIG. 7 depicts a plan view of the offset arrangement of FIG. 6, showing an end of the bias means 32, a pivot means 36 at P, a pair of arms 40, pivot axis 42 and a pair of first fixing points 47, one for each arm 40.

Pairs of parallelogram arm E-C are also depicted.

Bias forces applied from the bias means 32 work through the pivot means 36 to arms 40 through the pivot axis 42 and the fixing point to the parallelogram arm E-C.

It will be appreciated that there are mechanical equivalents to the arrangement of the parts of the invention disclosed. For example, the pivot point P could be arranged to be offset from pivot point D while the bias means 32 may act to bring the points P closer to H, thereby maintaining a force downward on the parallelogram arm D-B. This bias force is exerted on point P and through arm B-D, down to opener 10 via tyne shank 14. Point E would then be pivotably attached to the frame 18.

Furthermore, an adjustable bias force can be used to maintain depth in various soil types and provide adjustment to suit different seeding applications, soil types and conditions.

It will also be appreciated that a banded coulter could be used instead of a ground following wheel (gauge, depth wheel).

It will be appreciated by those skilled in the art, that the invention is not restricted in its use to the particular application described and neither is the present invention restricted in its preferred embodiment with regard to particular elements and/or features described herein. It will be appreciated that various modifications can be made without departing from the principles of the invention, therefore, the invention should be understood to include all such modifications within its scope.

We claim:

1. A ground following opener comprising:
   a support frame;
   a parallelogram means including a plurality of pivotally connected arms defining four corners and pivotally attached to said support frame at a first corner by a first pivot means;
   a tyne shank having a free end and supported by said parallelogram means, wherein one of said arms of said parallelogram means supports said tyne shank; an opener means supported at a free end of said tyne shank, wherein the pivotal attachment at the first corner of said parallelogram means allows rotational movement of said parallelogram means independent of said support frame movement such that said opener means passes over the surface of an obstacle in the ground;
   a ground following means attached to one arm of said parallelogram means supporting said tyne shank operative to move said parallelogram means as it follows the ground; and
   a single bias means pivotally attached at one of its ends to said support frame and also pivotally attached at its other end to one of said arms of said parallelogram means, such that said single bias means urges said opener means into the ground as well as biasing a return of said parallelogram means, tyne shank, ground following means and opener means to the ground following operation after being rotated independent of said frame when said opener means passes over the surface of an obstacle on the ground.

2. The ground following opener according to claim 1, wherein said parallelogram means includes an upper arm and said bias means comprises a compression spring assembly extending between the support frame and the upper arm of said parallelogram means so arranged as to compress upon rotational movement of said upper arm about said first pivot means as well as when the parallelogram means rotates in an upward direction and the opener means and tyne shank move rearward of said first pivot means about said first pivot means for said parallelogram means attached to said support frame.

3. The ground following opener according to claim 2, wherein said single bias means is arranged to load said tyne shank such that an effective loading at a top of said opener means does not increase beyond a predetermined break out load such that the tyne shank and opener means are constructed so as to withstand loading greater than that required to achieve tripping.

4. The ground following opener according to claim 1, wherein said single bias means is arranged to load the tyne shank such that an effective loading at a tip of the opener does not increase beyond a predetermined break out load such that the tyne shank and opener means are constructed so as to withstand loading greater than that required to achieve tripping.

5. A ground following opener according to claim 1, wherein said single bias means includes an adjustment means for varying a downward force exerted on an arm of said parallelogram means.

6. The ground following opener according to claim 1, wherein an axis of pivot of the pivotal attachment of said single bias means to one of said arms of said parallelogram means is offset from an axis of said first pivot means.

7. A ground following opener according to claim 1, wherein said ground following means includes a wheel which is located forward and to the side of a path of said opener means.

8. The ground following opener according to claim 7, wherein said ground following means is configured with a toe-in configuration.

9. A ground following opener comprising:
   a support frame;
   a parallelogram means includes a plurality of pivotally connected arms defining four corners and pivotally attached to said support frame at a first corner by a first pivot means;
   a tyne shank having a free end and supported by said parallelogram means, wherein one of said arms of said parallelogram means supports said tyne shank; an opener means supported at a free end of said tyne shank, wherein the pivotal attachment at the first corner of said parallelogram means allows rotational movement of said parallelogram means independent of said support frame such that said opener means passes over the surface of an obstacle in the ground;
   a ground following means attached to the arm of said parallelogram means supporting said tyne shank operative to move said parallelogram means as it follows the ground; and
   a single bias means pivotally attached at one of its ends to said support frame and also pivotally attached at its other end to one of said arms of said parallelogram means, such that said single bias means urges said opener means into the ground as well as biasing a return of said parallelogram means, tyne shank, ground following means and opener means to the ground following operation after being rotated independent of said frame when said opener means passes over the surface of an obstacle on the ground wherein said single bias means is arranged to load the tyne shank such that an effective loading at a tip of the opener means does not increase beyond a predetermined break out load such that the tyne shank and opener means are constructed so as to withstand loading greater than that required to achieve tripping.

10. The ground following opener according to claim 9, wherein said parallelogram means includes an upper arm and said single bias means comprises a compression spring assembly extending between the support frame and the upper arm of said parallelogram means so arranged as to compress upon rotational movement of said upper arm about said first pivot means as well as when the parallelogram means rotates in an upward direction and the opener means and tyne shank move rearward of said first pivot means about said first pivot means for said parallelogram means attached to said support frame.

11. The ground following opener according to claim 9, wherein said single bias means includes an adjustment means for varying a downward force exerted on an arm of said parallelogram means.

12. The ground following opener according to claim 11, wherein said single bias means is arranged to load said tyne shank such that an effective loading at a top of said opener means does not increase beyond a predetermined break out load such that the tyne shank and opener means are constructed so as to withstand loading greater than that required to achieve tripping.

13. The ground following opener according to claim 9, wherein an axis of pivot of the pivotal attachment of said single bias means to one of said arms of said parallelogram means is offset from an axis of said first pivot means.

14. The ground following opener according to claim 9, wherein said ground following means includes a wheel which is located forward and to the side of a path of said opener means.

15. The ground following opener according to claim 14, wherein said ground following means is configured with a toe-in configuration.

* * * * *

UNITED STATES PATENT AND TRADEMARK OFFICE
CERTIFICATE OF CORRECTION

PATENT NO. : 5,794,711
DATED : August 18, 1998
INVENTOR(S) : Michael Gerard Slattery It is certified that error appears in the above-identified patent and that said Letters Patent is hereby corrected as shown below:

Column 3 Line 19 "BRIEF DESCRIPTION OF THE FIGS." should read --BRIEF DESCRIPTION OF THE DRAWINGS--.

Column 5 Lines 66-67 "passing through H and P" should read --passing through H and F--.

Column 6 Line 1 "element H-P" should read --element H-F--.

Column 6 Line 33 "pivot point P" should read --pivot point F--.

Column 6 Lines 33-34 "parallelogram 15 end" should read --parallelogram end--.

Column 6 Line 36 "point P" should read --point F--.

Column 6 Line 39 "position of P" should read --position of F--.

Column 6 Line 40 "line P-E" should read --line F-E--.

Column 6 Line 41 "line H-P" should read --line H-F--.

Column 6 Line 44 "point P" should read --point F--.

Column 6 Line 44 "Point P" should read --Point F--.

Column 6 Line 50 "offset point P" should read --offset point F--.

Column 6 Line 51 "Point P" should read --Point F--.

Column 6 Lines 55-56 "36 at P" should read --36 at F--.

Column 6 Line 65 "pivot point P" should read --pivot point F--.

Column 6 Line 67 "points P" should read --points F--.

UNITED STATES PATENT AND TRADEMARK OFFICE
CERTIFICATE OF CORRECTION

PATENT NO. : 5,794,711
DATED : August 18, 1998
INVENTOR(S) : Michael Gerard Slattery It is certified that error appears in the above-identified patent and that said Letters Patent is hereby corrected as shown below:

Column 7 Line 2 "point P" should read --point F--.

Signed and Sealed this

Twelfth Day of January, 1999

Attest:

Attesting Officer

Acting Commissioner of Patents and Trademarks